US012547114B2

(12) United States Patent
Minoshima et al.

(10) Patent No.: US 12,547,114 B2
(45) Date of Patent: Feb. 10, 2026

(54) IMAGE FORMING APPARATUS INCLUDING MOVABLE CHUTE MOVABLE TO GUIDE SHEET, AND SOLENOID ACTUATOR CONFIGURED TO CAUSE MOVABLE CHUTE TO MOVE

(71) Applicant: BROTHER KOGYO KABUSHIKI KAISHA, Nagoya (JP)

(72) Inventors: Saya Minoshima, Gifu (JP); Soma Nagaya, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/799,645

(22) Filed: Aug. 9, 2024

(65) Prior Publication Data

US 2025/0068115 A1 Feb. 27, 2025

(30) Foreign Application Priority Data

Aug. 22, 2023 (JP) ................................ 2023-134865
Aug. 22, 2023 (JP) ................................ 2023-134868

(51) Int. Cl.
*G03G 15/00* (2006.01)
*B65H 5/36* (2006.01)
(Continued)

(52) U.S. Cl.
CPC ............ *G03G 15/657* (2013.01); *B65H 5/36* (2013.01); *G03G 15/6529* (2013.01);
(Continued)

(58) Field of Classification Search
CPC ............ G03G 15/6529; G03G 15/657; G03G 21/1647; G03G 21/1652; G03G 21/1657;
(Continued)

(56) References Cited

U.S. PATENT DOCUMENTS

2008/0317532 A1* 12/2008 Ehara .................. G03G 15/657
399/400
2013/0004222 A1* 1/2013 Sakaya .................... B65H 5/36
271/226
2013/0051835 A1 2/2013 Kubo

FOREIGN PATENT DOCUMENTS

JP 10-291665 A 11/1998
JP 2002-067414 A 3/2002
(Continued)

*Primary Examiner* — Sophia S Chen
(74) *Attorney, Agent, or Firm* — Merchant & Gould P.C.

(57) ABSTRACT

An image forming apparatus includes: a main housing; a transfer roller rotatable about an axis extending in a first direction; a fixing device; a movable chute positioned between the transfer roller and the fixing device in a conveying direction; and a solenoid actuator. The movable chute is configured to guide the sheet, and is movable between: a first position; and a second position at which a downstream end in the conveying direction of the movable chute is positioned further downward relative to the downstream end of the movable chute positioned at the first position. The solenoid actuator is configured to cause the movable chute to move. The main housing includes: a first frame positioned further toward one side in the first direction relative to the movable chute and supporting the solenoid actuator; and a second frame positioned further toward another side in the first direction relative to the movable chute.

19 Claims, 13 Drawing Sheets

(51) Int. Cl.
*G03G 21/16* (2006.01)
*G03G 21/20* (2006.01)

(52) U.S. Cl.
CPC ..... *G03G 21/1647* (2013.01); *G03G 21/1652* (2013.01); *G03G 21/1657* (2013.01); *G03G 21/206* (2013.01); *B65H 2404/62* (2013.01); *B65H 2555/13* (2013.01); *B65H 2601/254* (2013.01)

(58) Field of Classification Search
CPC .... G03G 21/206; B65H 5/36; B65H 2404/62; B65H 2556/13; B65H 2601/254
See application file for complete search history.

(56) References Cited

FOREIGN PATENT DOCUMENTS

| | | | |
|---|---|---|---|
| JP | 2008-310241 | A | 12/2008 |
| JP | 2010-091631 | A | 4/2010 |
| JP | 2010-230945 | A | 10/2010 |
| JP | 2013-045052 | A | 3/2013 |
| JP | 2015-143774 | A | 8/2015 |
| JP | 2015-203799 | A | 11/2015 |
| JP | 2016-018067 | A | 2/2016 |

* cited by examiner

IMAGE FORMING APPARATUS INCLUDING MOVABLE CHUTE MOVABLE TO GUIDE SHEET, AND SOLENOID ACTUATOR CONFIGURED TO CAUSE MOVABLE CHUTE TO MOVE

REFERENCE TO RELATED APPLICATIONS

This application claims priorities from Japanese Patent Application Nos. 2023-134865 filed on Aug. 22, 2023 and 2023-134868 filed on Aug. 22, 2023. The entire contents of these priority applications are incorporated herein by reference.

BACKGROUND ART

There has been conventionally known an image forming apparatus including a movable chute, and a solenoid actuator. The movable chute is configured to guide a sheet from a photosensitive drum to a fixing device. The solenoid actuator is configured to move the movable chute. In such a conventional image forming apparatus, the solenoid actuator is configured to move the movable chute upward and downward to thereby restrain occurrence of wrinkles on the sheet at the time of entry of the sheet into the fixing device.

SUMMARY

In a case where a length of a harness connecting a control board configured to control operation of the movable chute to the solenoid actuator configured to move the movable chute is long, noise received by the harness in a main housing and noise generated from the harness become amplified. Also, such a long harness causes increase in the wiring cost. Accordingly, there is a demand that the length of the harness connecting the control board to the solenoid actuator be shorter.

Further, in a case where the movable chute is operated frequently, a temperature of the solenoid actuator may be higher. Generally, the solenoid actuator with the high temperature has a degraded performance such as lowering of a suction force. Accordingly, there is a problem that it is difficult to operate the movable chute stably and continuously.

It is an object of the present disclosure to provide an image forming apparatus capable of reducing a length of a harness connecting a solenoid actuator configured to control a movable chute to a control board configured to control the solenoid actuator.

It is another object of the present disclosure to provide an image forming apparatus capable of efficiently cooling a solenoid actuator in order to maintain stabilized operation of a movable chute continuously.

In order to attain the above and other objects, the present disclosure provides an image forming apparatus including: a main housing; a transfer roller; a fixing device; a movable chute; and a solenoid actuator. The transfer roller is rotatable about a rotation axis extending in a first direction. The transfer roller is configured to transfer a toner image on a sheet. The fixing device is configured to fix the toner image that has been transferred on the sheet to the sheet. The movable chute is positioned between the transfer roller and the fixing device in a conveying direction in which the sheet is conveyed. The movable chute is configured to guide the sheet. The movable chute is movable between: a first position; and a second position at which a downstream end in the conveying direction of the movable chute is positioned further downward relative to the downstream end in the conveying direction of the movable chute positioned at the first position. The solenoid actuator is configured to cause the movable chute to move between the first position and the second position. The main housing includes: a first frame; and a second frame. The first frame is positioned further toward one side in the first direction relative to the movable chute. The first frame supports the solenoid actuator. The second frame is positioned further toward another side in the first direction relative to the movable chute.

In the above structure, the solenoid actuator is supported by the first frame which is positioned further toward the one side in the first direction relative to the movable chute. Accordingly, a movable range in an up-down direction of the movable chute is not limited by the solenoid actuator, whereby the movable chute can move greatly in the up-down direction.

DESCRIPTION

Hereinafter, one embodiment of the present disclosure will be described while referring to the accompanying drawings.

Figure 1:
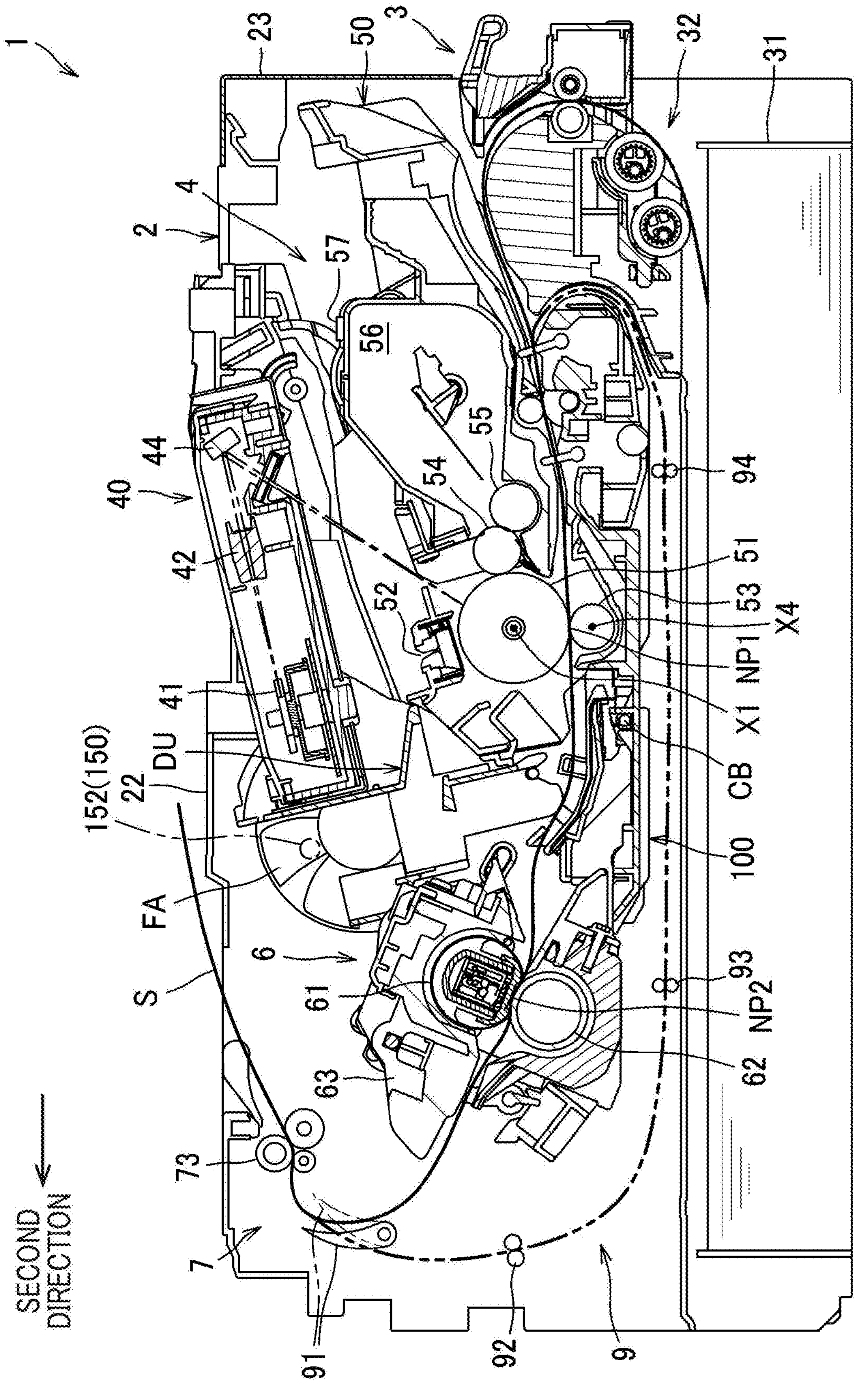
FIG. 1 is a cross-sectional view illustrating the overall structure of an image forming apparatus.

An image forming apparatus 1 illustrated in FIG. 1 is a laser printer configured to form an image on a sheet S. The image forming apparatus 1 includes a main housing 2, a feeding unit 3, a process unit 4, a fixing device 6, and a discharging unit 7.

In the following description, a direction in which a rotation axis X1 of a photosensitive drum 51 (described later) extends will be referred to as "first direction". Further, a conveying direction in which the sheet S is conveyed from the process unit 4 toward the fixing device 6 will be referred to as "second direction". The first direction crosses the second direction. In the present embodiment, the first direction is orthogonal to the second direction.

Note that arrows in the drawings for these directions each point to one side of the respective direction. That is, a leading side of the arrows corresponds to the one side of the respective directions, and a trailing side of the arrows corresponds to the other side of the respective directions.

The feeding unit 3 includes a feed tray 31, and a sheet feeding unit 32. The feed tray 31 is a sheet tray configured to accommodate therein the sheet S. The sheet feeding unit 32 is configured to convey the sheet S from the feed tray 31 toward the process unit 4.

The process unit 4 is configured to form a toner image on the sheet S supplied by the sheet feeding unit 32. The process unit 4 includes an exposure unit 40, and a process cartridge 50.

The exposure unit 40 is positioned at an upper portion within the main housing 2, and includes a laser emitting portion (not illustrated), a polygon mirror 41 driven to rotate, a lens 42, and a reflection mirror 44. A surface of the photosensitive drum 51 is scanned at high speed with a laser beam (indicated by a chain line in FIG. 1) emitted on a basis of image data from the laser emitting portion after the laser beam is reflected by the polygon mirror 41, passes through the lens 42, and is reflected by the reflection mirror 44.

The process cartridge 50 is positioned downward of the exposure unit 40. The process cartridge 50 is attachable to and detachable from the main housing 2 through an opening exposed when a front cover 23 provided at the main housing 2 is opened, thereby attaining replacement of the process cartridge 50 with a new process cartridge 50. The process cartridge 50 includes the photosensitive drum 51, a charger 52, a transfer roller 53, a developing roller 54, a supply roller 55, a toner accommodating portion 56, and a toner memory 57.

The photosensitive drum 51 is rotatable about the rotation axis X1 extending in the first direction.

The transfer roller 53 is rotatable about a rotation axis X4 extending in the first direction. The transfer roller 53 and the photosensitive drum 51 form a transfer nipping region NP1 therebetween in cooperation with each other. The transfer roller 53 is configured to transfer a toner image on the photosensitive drum 51 onto the sheet S. The toner memory 57 is a memory in which information related to the process cartridge 50 is stored.

The fixing device 6 is configured to thermally fix, to the sheet S, the toner image that has been transferred onto the sheet S. The fixing device 6 is positioned downstream of the process unit 4 in the conveying direction. The fixing device 6 includes a heating rotor 61, a pressure rotor 62, and a fixing frame 63.

The heating rotor 61 is a member configured to heat the sheet S. The heating rotor 61 includes an endless belt, and a heater positioned inside a space encircled by the endless belt. The endless belt of the heating rotor 61 circularly moves while nipping the sheet S in cooperation with the pressure rotor 62, thereby heating the sheet S.

The pressure rotor 62 and the heating rotor 61 form a fixing nipping region NP2 therebetween in cooperation with each other. The pressure rotor 62 is a roller whose surface is made of electrically non-conductive elastic material. The heating rotor 61 and the pressure rotor 62 are urged toward each other by an urging member (not illustrated).

The fixing frame 63 is a frame that covers the heating rotor 61 and the pressure rotor 62. The fixing frame 63 supports the heating rotor 61 and the pressure rotor 62 such that the heating rotor 61 and the pressure rotor 62 are rotatable.

In the process unit 4, the surface of the photosensitive drum 51 is exposed to light through high-speed scanning with the laser beam emitted from the exposure unit 40 after the surface of the photosensitive drum 51 is uniformly charged with positive polarity by the charger 52, whereby an electrostatic latent image is formed on the photosensitive drum 51. Further, toner in the toner accommodating portion 56 is supplied to the developing roller 54 through the supply roller 55, and is carried on the developing roller 54.

The toner carried on the developing roller 54 is supplied to the electrostatic latent image formed on the photosensitive drum 51 to make the electrostatic latent image visible, thereby forming a toner image on the photosensitive drum 51. Thereafter, the sheet S supplied from the feeding unit 3 is conveyed to a portion between the photosensitive drum 51 and the transfer roller 53 (the transfer nipping region NP1) while a transfer bias of negative polarity is applied to the transfer roller 53. As a result, the toner image on the photosensitive drum 51 is transferred onto the sheet S. Then, the sheet S is conveyed to a portion between the heating rotor 61 and the pressure rotor 62 (the fixing nipping region NP2). Consequently, the toner image transferred to the sheet S is thermally fixed to the sheet S.

The discharging unit 7 is configured to convey the sheet S having a toner image thermally fixed thereto toward an outside of the main housing 2. The discharging unit 7 includes discharging rollers 73. The discharging rollers 73 are configured to discharge the sheet S onto a discharge tray 22 formed on the main housing 2.

The image forming apparatus 1 further includes a sheet re-conveying mechanism 9. The sheet re-conveying mechanism 9 is a mechanism configured to, after the image is formed on a first surface of the sheet S, convey the sheet S again to the process unit 4 while the sheet S is in an inverted state so that an image is formed on a second surface of the sheet S opposite the first surface. Note that the sheet S to be conveyed again toward the process unit 4 is indicated by a two-dotted chain line in FIG. 1.

The sheet re-conveying mechanism 9 includes a flapper 91, and a plurality of re-conveying rollers 92, 93, and 94. The flapper 91 is pivotally movable between an initial position indicated by a solid line and a re-conveying position indicated by a two-dotted line. In a state where the flapper 91 is at the initial position, the sheet S discharged from the fixing device 6 is guided toward the discharge tray 22 by the flapper 91. On the other hand, in a state where the flapper 91 is at the re-conveying position, the sheet S discharged from the fixing device 6 is guided toward a re-conveying passage by the discharging rollers 73 performing reverse rotation at a prescribed timing.

Figure 2:
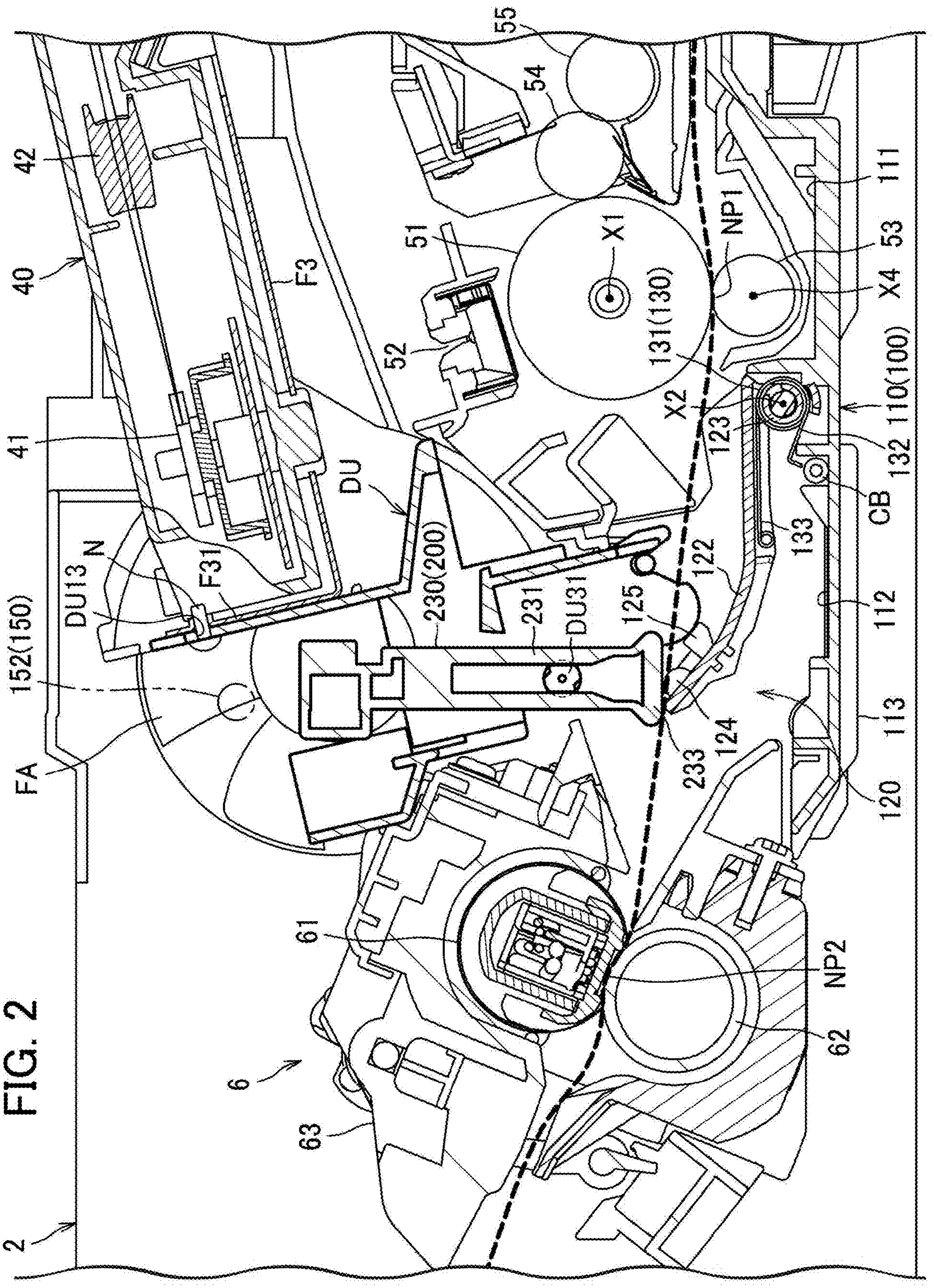
FIG. 2 is a partial cross-sectional view illustrating a portion in the vicinity of a movable chute positioned at its first position as viewed in a first direction.

The image forming apparatus 1 further includes a guide member 100. The guide member 100 is positioned downward of the process cartridge 50, and is configured to guide the sheet S from the transfer nipping region NP1 toward the fixing nipping region NP2. The guide member 100 is also configured to guide the sheet S on the re-conveying passage toward the transfer nipping region NP1. The re-conveying passage is formed at a position downward of the guide member 100. As illustrated in FIG. 2, the guide member 100 includes a base part 110, a movable chute 120, and springs 130. The movable chute 120 is movable between a first position (a position illustrated in FIG. 2) and a second position (a position illustrated in FIG. 3).

The base part 110 has a first recessed part 111, a second recessed part 112, and a lower surface 113. The first recessed part 111 is positioned on an upper surface of the base part 110 at an end portion of the base part 110 on the other side in the second direction. The first recessed part 111 is a recess in which a part of the transfer roller 53 is positioned. The second recessed part 112 is positioned on the upper surface of the base part 110 at an end portion the base part 110 on the one side in the second direction. The second recessed part 112 is a recess that supports the movable chute 120 to allow pivotal movement of the movable chute 120. The lower surface 113 is as a lower surface of the base part 110, and serves as a guiding surface for guiding the sheet S on the re-conveying passage.

The movable chute 120 is positioned between the photosensitive drum 51 and the fixing device 6 in the conveying direction of the sheet S. The movable chute 120 is configured to guide the sheet S. The movable chute 120 is pivotally movable between the first position illustrated in FIG. 2 and the second position illustrated in FIG. 3. At the second position, the movable chute 120 is positioned further downward relative to the movable chute 120 positioned at the first position. Specifically, at the second position of the movable chute 120, a downstream end in the conveying direction of the movable chute 120 is positioned further downward relative to the downstream end in the conveying direction of the movable chute 120 positioned at the first position. The movable chute 120 is pivotally movable between the first position and the second position about a pivot axis X2 extending in the first direction.

Figure 4:
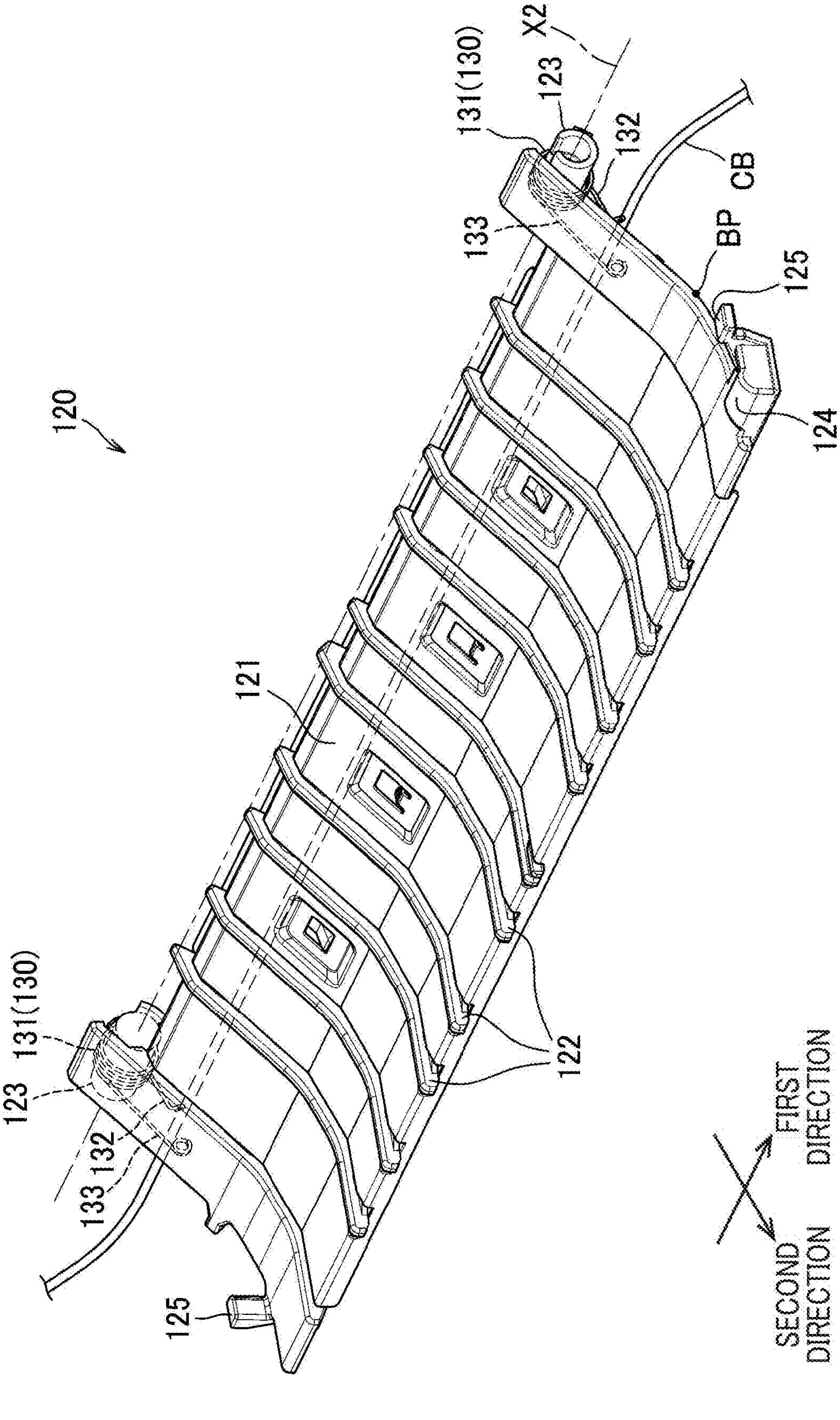
FIG. 4 is a perspective view of the movable chute.

As illustrated in FIG. 4, the movable chute 120 includes a base part 121, a plurality of guide ribs 122, sleeve parts 123, a pressed part 124, and stoppers 125.

The base part 121 has a plate-like shape curved so as to be recessed downward. The base part 121 extends in both the first direction and the second direction.

The plurality of guide ribs 122 protrudes upward from the base part 121, and extends in the second direction in conformance with the curvature of the base part 121. Each of the guide ribs 122 has an upper surface configuring a conveying surface of the movable chute 120 for conveying the sheet S.

The sleeve parts 123 are positioned at an end portion of the base part 121 on the other side in the second direction. One sleeve part 123 is disposed at each end in the first direction of the movable chute 120. The sleeve parts 123 are parts that support the movable chute 120 so that the movable chute 120 is pivotally movable.

The pressed part 124 is positioned at an end of the movable chute 120 on the one side in the first direction and at an end of the movable chute 120 on the one side in the second direction. The pressed part 124 protrudes upward from the base part 121. The pressed part 124 is configured to be pressed by a link mechanism 200 (described later) at the time of movement of the movable chute 120 from the first position to the second direction.

The stoppers 125 are configured to contact a duct DU (described later) so that movement of the movable chute 120 is restricted. The stoppers 125 are positioned between the sleeve parts 123 and the pressed part 124 in the second direction. One stopper 125 is disposed at each end in the first direction of the movable chute 120.

Each of the springs 130 is a torsion spring. One spring 130 is disposed at each end in the first direction of the movable chute 120. Each of the springs 130 includes a coil part 131, a first arm 132, and a second arm 133. The coil part 131 is provided over the corresponding sleeve part 123 to be engaged with the same. The first arm 132 extends from the coil part 131 and is hooked to the base part 110. The second arm 133 extends from the coil part 131 and is hooked to the movable chute 120. The springs 130 normally urge the movable chute 120 upward. Hence, while the movable chute 120 is not pressed by the link mechanism 200, the movable chute 120 is urged upward by the springs 130, and is positioned at the first position by the stoppers 125 contacting the duct DU.

Figure 5:
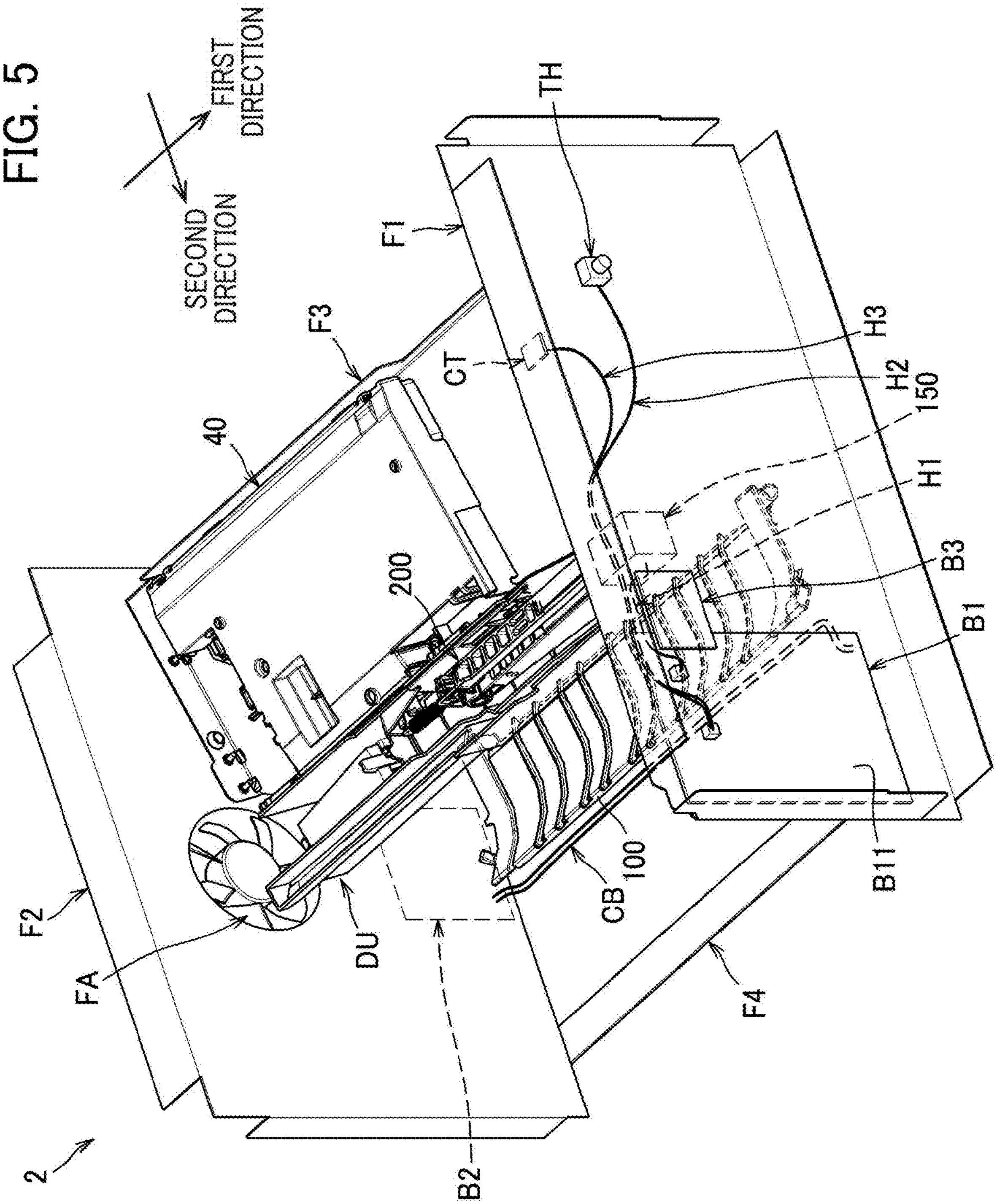
FIG. 5 is a perspective view illustrating positions of a first frame, a second frame, an exhaust fan, and a duct.

As illustrated in FIG. 5, the main housing 2 includes a first frame F1, a second frame F2, a third frame F3, and a fourth frame F4.

The first frame F1 is a wall positioned on the one side in the first direction of the main housing 2. The first frame F1 is positioned further toward the one side in the first direction relative to the movable chute 120.

The second frame F2 is a wall positioned on the other side in the first direction of the main housing 2. The second frame F2 is positioned further toward the other side in the first direction relative to the movable chute 120.

The third frame F3 has a flat plate-like shape and extends in the first direction. The third frame F3 connects the first frame F1 and the second frame F2 to each other. The third frame F3 has an upper surface to which the exposure unit 40 is fixed. The third frame F3 includes a flange F31 (see FIG. 6) that extends upward from an end portion of the third frame F3 on the one side in the second direction.

The fourth frame F4 has a flat plate-like shape and extends in the first direction. The fourth frame F4 connects a lower end of the first frame F1 and a lower end of the second frame F2 to each other.

Figure 6:
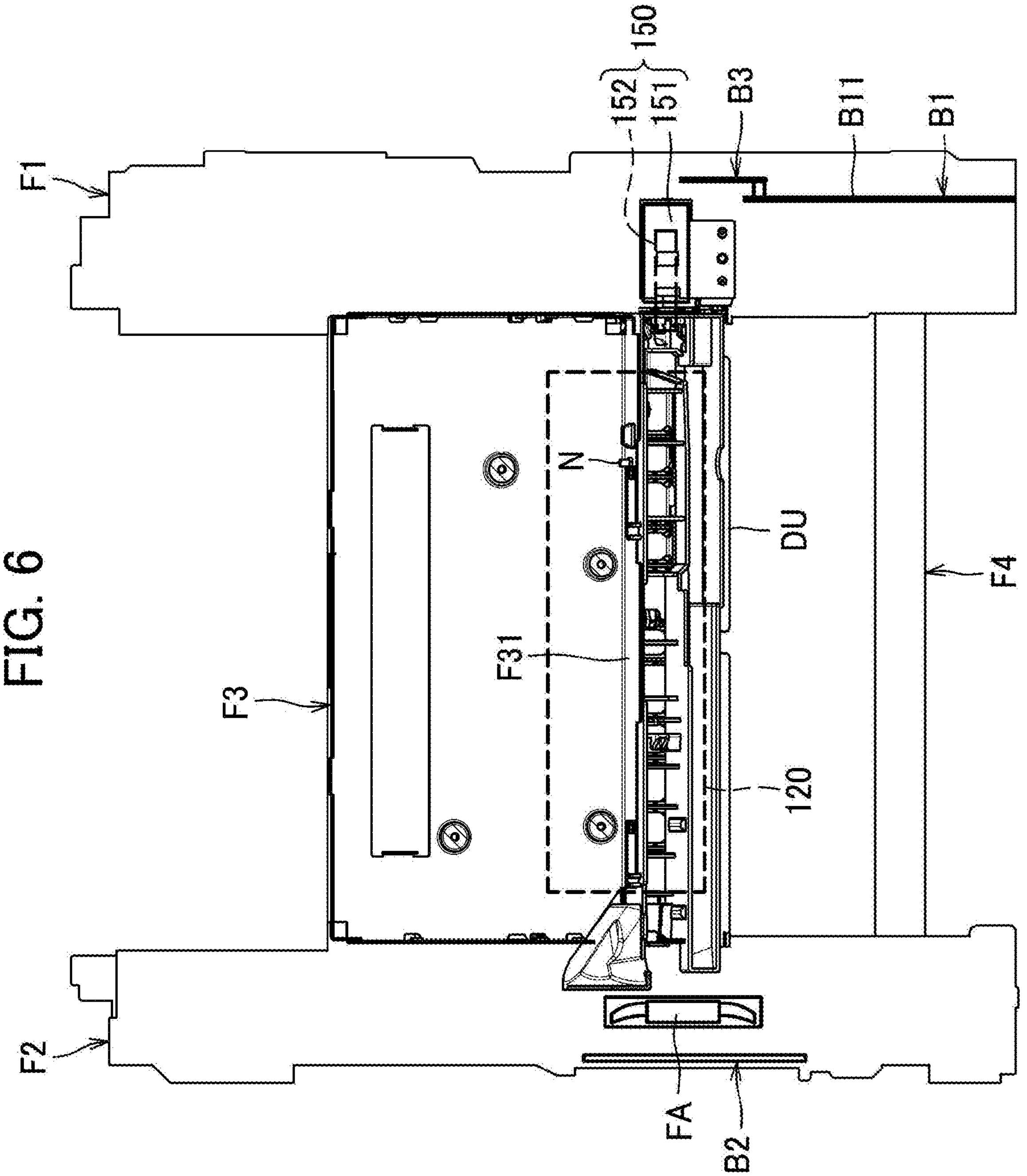
FIG. 6 is a top view illustrating the positions of the first frame, the second frame, the exhaust fan, and the duct.

As illustrated in FIGS. 5 and 6, the image forming apparatus 1 further includes an exhaust fan FA, the duct DU, a control board B1, a second board B2, a cable CB, a radio board B3, a first harness H1, a second harness H2, a third harness H3, a thermistor TH, an electric contact CT, a solenoid actuator 150, and the link mechanism 200.

The exhaust fan FA is positioned at the second frame F2. The exhaust fan FA is positioned at an approximately center in the second direction of the second frame F2. The exhaust fan FA is configured to discharge air in the main housing 2 out of the main housing 2.

The duct DU is a member configured to guide air in the main housing 2 toward the exhaust fan FA so that air in the main housing 2 is discharged to the outside of the main housing 2. Specifically, the duct DU is configured to guide air in the main housing 2 from the one side in the first direction toward the other side in the first direction. The duct DU extends in the first direction from the first frame F1 to the second frame F2.

The duct DU is overlapped with the movable chute 120 when viewed in an up-down direction (see also FIG. 1). The solenoid actuator 150 is positioned at an end portion of the duct DU on the one side in the first direction. The exhaust fan FA is positioned at an end portion of the duct DU on the other side in the first direction. That is, the duct DU is positioned between the exhaust fan FA and the solenoid actuator 150. The duct DU is positioned further toward the one side in the first direction relative to the exposure unit 40. The duct DU is fixed to the flange F31 of the third frame F3 by a screw N (see also FIG. 2).

Figure 7:
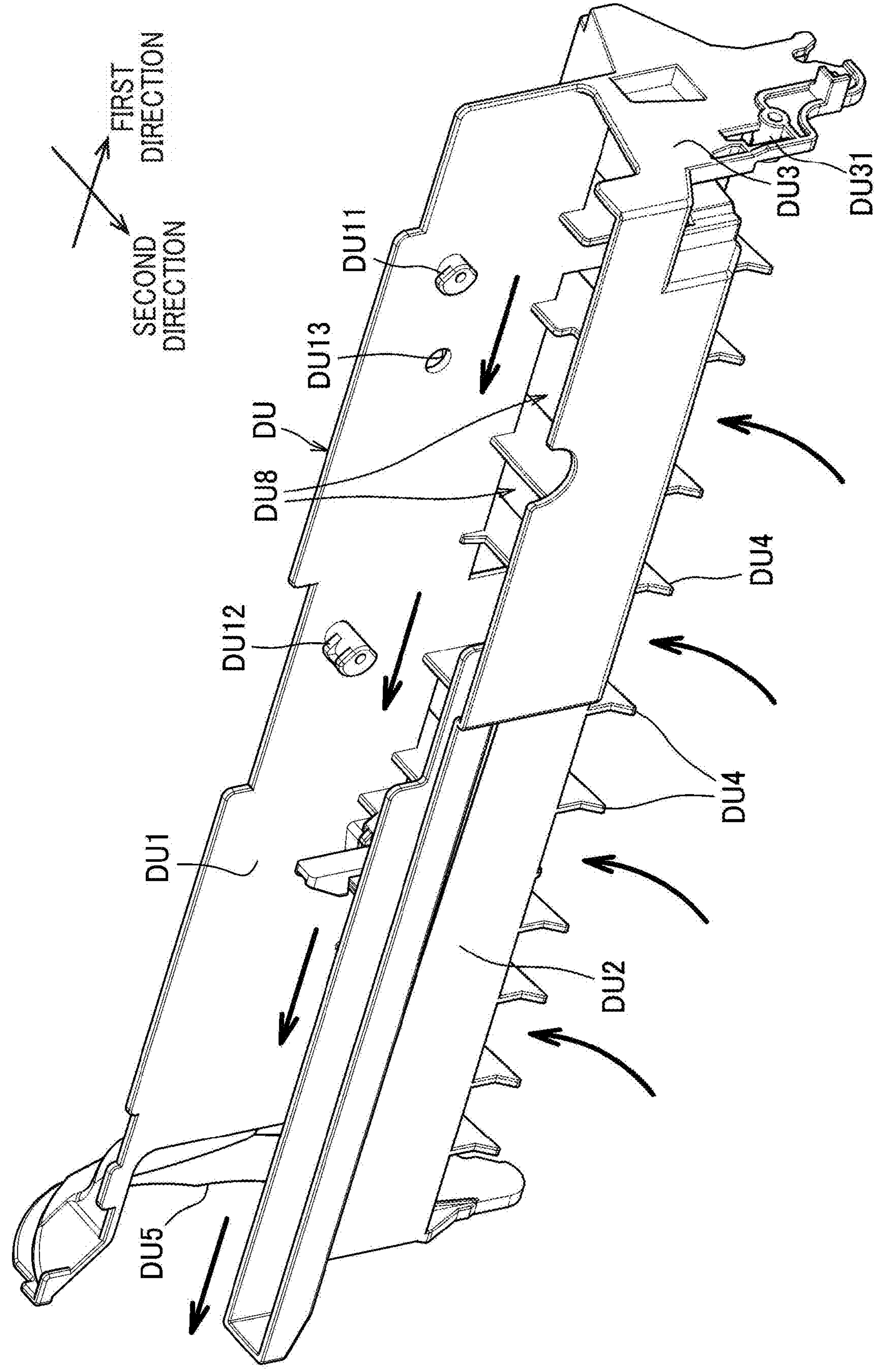
FIG. 7 is a perspective view of the duct.

As illustrated in FIG. 7, the duct DU includes a first wall DU1, a second wall DU2, a third wall DU3, and a plurality of connection ribs DU4, and has an opening DU5. The first wall DU1, the second wall DU2, the third wall DU3, and the plurality of connection ribs DU4 constitute a flow passage along which air flows in the first direction. In other words, the flow passage in the duct DU is a space defined by the first wall DU1, the second wall DU2, the third wall DU3, and the plurality of connection ribs DU4.

The first wall DU1 is a wall that extends orthogonal to the second direction. The first wall DU1 is elongated in the first direction. The first wall DU1 includes a first protrusion DU11 and a second protrusion DU12, and has a fixing hole DU13. The first protrusion DU11 and the second protrusion DU12 are used for fixing the link mechanism 200 (described later). The fixing hole DU13 is a hole through which the screw N is inserted for fixing the duct DU to the third frame F3.

The second wall DU2 is a wall that extends orthogonal to the second direction. The second wall DU2 is elongated in the first direction. The second wall DU2 faces the first wall DU1.

The third wall DU3 connects an end of the first wall DU1 on the one side in the first direction and an end of the second wall DU2 on the one side in the first direction to each other. The DU3 extends orthogonal to the first direction. The third wall DU3 includes a protruding part DU31 that protrudes toward the other side in the first direction. A pair of grooves DU32 extending in the up-down direction are formed on an outer peripheral surface of the protruding part DU31 (see FIG. 13).

Each of the connection ribs DU4 is a rib that connects a lower end of the first wall DU1 and a lower end of the second wall DU2 to each other. Each of the connection ribs DU4 is a wall that extends orthogonal to the first direction, and is elongated in the second direction. Of the plurality of connection ribs DU4, two connection ribs DU4 adjacent to each other form therebetween a hole DU8 that is open in the up-down direction. Air heated in the main housing 2 enters the flow passage of the duct DU through the holes DU8 formed between the respective two connection ribs DU4.

The opening DU5 is an opening formed at an end of the duct DU on the other side in the first direction. The opening DU5 faces the exhaust fan FA in the first direction. As the exhaust fan FA is operated, air introduced into the duct DU is discharged to the outside of the duct DU through the opening DU5.

Figure 8:
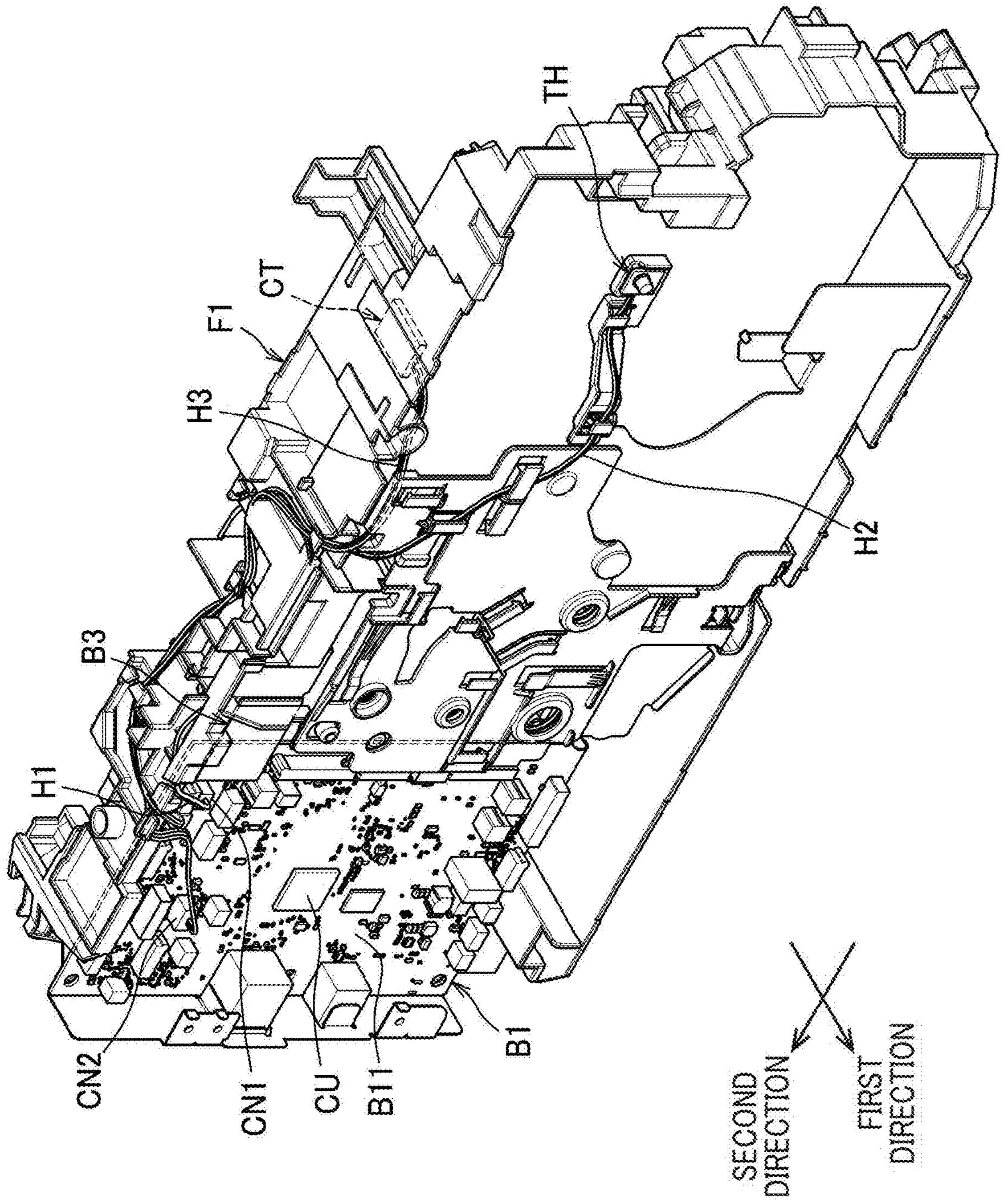
FIG. 8 is a perspective view of the first frame.

As illustrated in FIG. 8, the control board B1 is a board that includes a controller CU. The control board B1 is positioned on the first frame F1. The control board B1 is positioned at an end of the first frame F1 on the one side in the second direction. The control board B1 has a component side B11 on which electronic components are mounted.

The component side B11 faces the one side in the first direction, i.e., faces outward of the main housing 2. In other words, the component side B11 faces in a direction away from the movable chute 120 in the first direction (see FIG. 6). The component side B11 is positioned farther from the movable chute 120 than the solenoid actuator 150 is from the movable chute 120 in the first direction. In addition to the controller CU, a first connector CN1, a second connector CN2, and the radio board B3 are mounted on the component side B11.

The first harness H1 is connected to the first connector CN1 through which an electric current is applied to the solenoid actuator 150. The first harness H1 connects the control board B1 and the solenoid actuator 150 to each other. The first harness H1 extends upward from the first connector CN1, extends to avoid the radio board B3, and is wired at a position further toward the other side in the first direction relative to the radio board B3 (see FIG. 9). An insertion port formed at the first connector CN1 for the first harness H1 faces the one side in the first direction, i.e., faces outward of the main housing 2. The first harness H1 is an example of the "harness". The first connector CN1 is an example of the "connector".

Both the second harness H2 and the third harness H3 are connected to the second connector CN2. The second harness H2 connects the control board B1 and the thermistor TH to each other. The third harness H3 connects the control board B1 and the electric contact CT to each other. Each of the second harness H2 and the third harness H3 extends upward from the second connector CN2, extends so as to avoid the radio board B3, and is wired at a position further toward the other side in the first direction relative to the radio board B3 (see FIG. 9). Insertion ports formed at the second connector CN2 for the second connector H2 and the third connector H3 face the one side in the first direction, i.e., faces outward of the main housing 2.

The controller CU includes a CPU, a RAM, a ROM, and an input/output circuit. The controller CU is configured to execute various control by performing various arithmetic processing on the basis of programs, data, and the like which are stored in the ROM. In the present embodiment, the controller CU is configured to control the solenoid actuator 150. Specifically, each time an image is formed on a sheet S, by controlling the solenoid actuator 150: the controller CU causes the movable chute 120 to be positioned at the first position (see FIG. 2) before a front edge of the sheet S (i.e., a downstream edge in the conveying direction of the sheet S) reaches the fixing device 6; and the controller CU causes the movable chute 120 to move from the first position (see FIG. 2) to the second position (see FIG. 3) after the front edge of the sheet S (i.e., the downstream edge in the conveying direction of the sheet S) reaches the fixing device 6.

The radio board B3 is a board provided for performing wireless communication. The radio board B3 is directly connected to the control board B1. That is, the radio board B3 is directly connected to the control board B1 without any intervention through a harness and the like.

As illustrated in FIGS. 5 and 6, the second board B2 is positioned on the second frame F2. The second board B2 includes an AC-DC converter (not illustrated). The AC-DC converter is a circuit configured to convert an AC voltage inputted from a commercial power supply into a predetermined DC voltage. For example, the AC-DC converter converts AC 100V into DC 24V. The control board B1 and the second board B2 are connected to each other via the cable CB. The converted DC voltage is applied from the second board B2 to the control board B1 via the cable CB.

Figure 3:
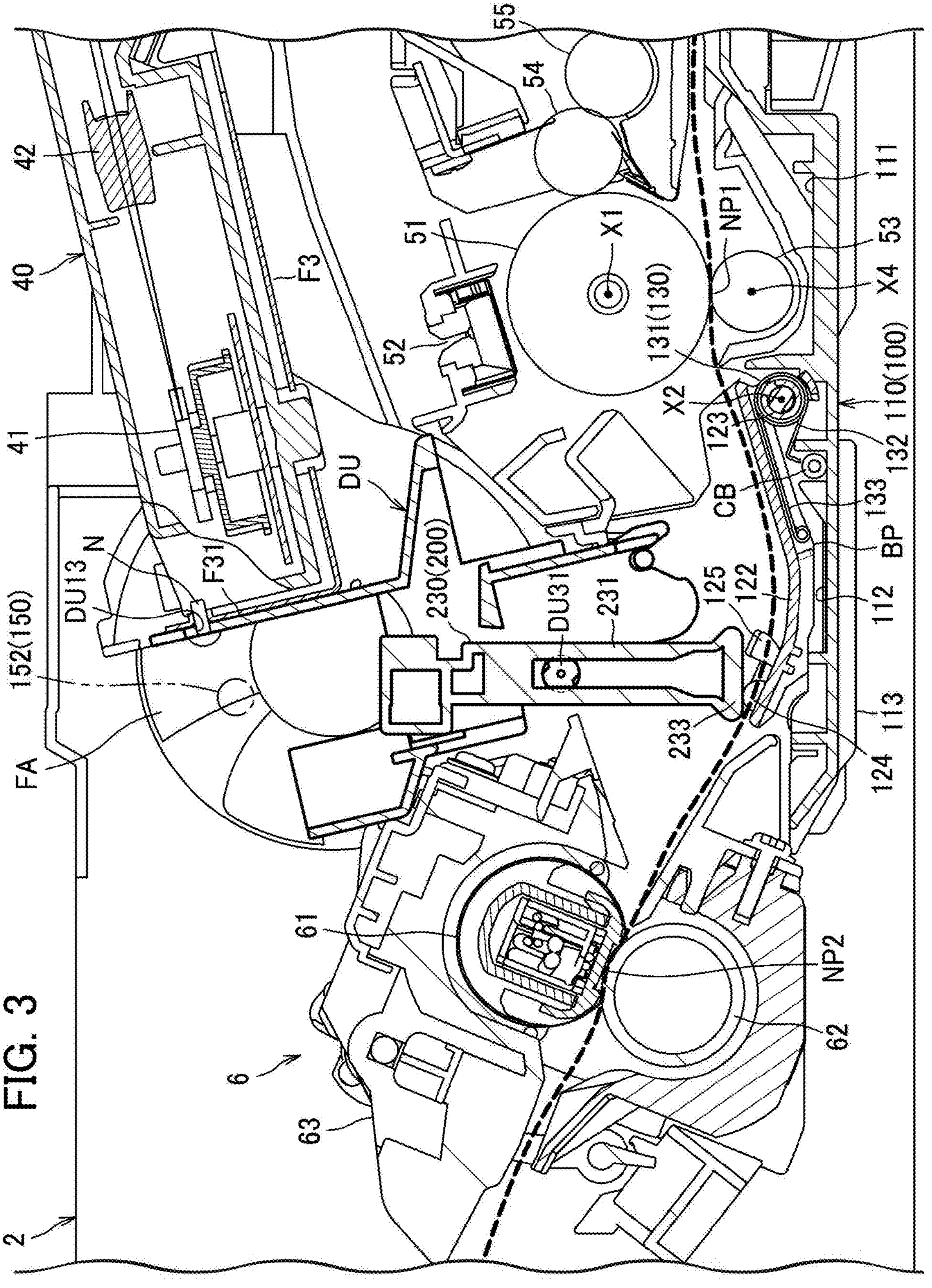
FIG. 3 is a partial cross-sectional view illustrating the portion in the vicinity of the movable chute positioned at its second position as viewed in the first direction.

The cable CB is a cable that electrically connects the control board B1 and the second board B2 to each other. As illustrated in FIG. 4, the cable CB extends at a position downward of the movable chute 120. As illustrated in FIG. 3, with respect to the conveying direction of the sheet S, the cable CB extends at a position between the pivot axis X2 of the movable chute 120 and a lowermost point BP of the movable chute 120 positioned at the second position.

Figure 9:
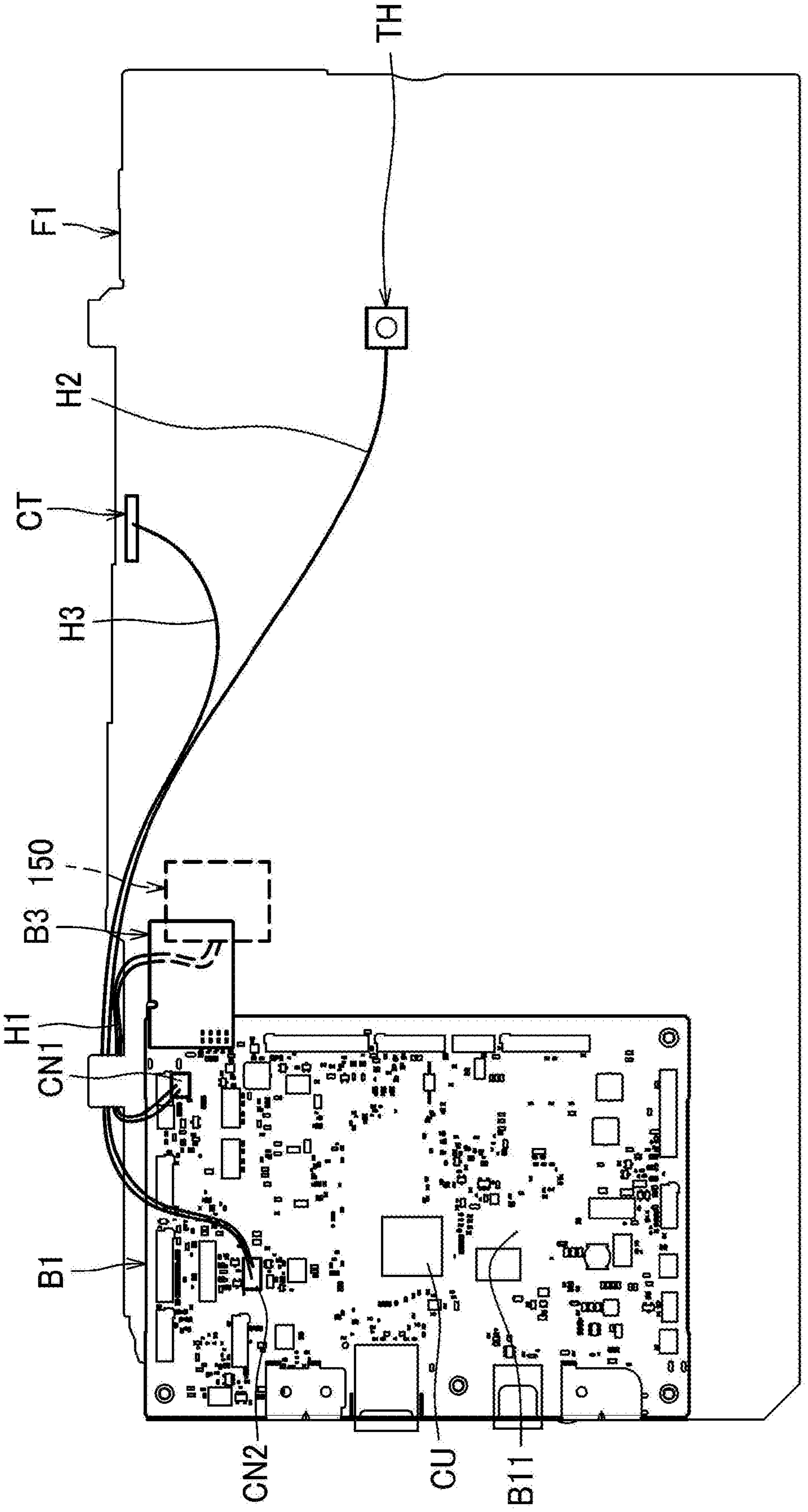
FIG. 9 is a front view of the first frame.

As illustrated in FIG. 6, the control board B1 is positioned between the movable chute 120 and the radio board B3 in the first direction. As illustrated in FIGS. 5 and 9, the radio board B3 is positioned on the opposite side of the first frame F1 from the solenoid actuator 150 in the first direction. At least a part of the solenoid actuator 150 is overlapped with the radio board B3 via the first frame F1 when viewed in the first direction. Further, an upper end of the radio board B3 is positioned further upward relative to an upper end of the solenoid actuator 150. With respect to the up-down direction, the upper end of the radio board B3 is positioned between an upper end of the control board B1 and the upper end of the solenoid actuator 150.

As illustrated in FIG. 8, the thermistor TH is positioned on an outer surface of the first frame F1. The thermistor TH is positioned on an end portion of the first frame F1 on the other side in the second direction. The thermistor TH is configured to detect a temperature outside the main housing 2.

The electric contact CT is positioned on an upper portion of the first frame F1. The CT is positioned on the end portion of the first frame F1 on the other side in the second direction. The electric contact CT is electrically connected to the toner memory 57. The controller CU is configured to read information from the toner memory 57 through the electric contact CT.

As illustrated in FIG. 6, the solenoid actuator 150 is positioned on the first frame F1, and is supported by the first frame F1. The solenoid actuator 150 is positioned closer to the first frame F1 than to the second frame F2 in the first direction. As illustrated in FIG. 2, the solenoid actuator 150 is overlapped with the flow passage of the duct DU when viewed in the first direction. Further, the solenoid actuator 150 is also overlapped with the exhaust fan FA when viewed in the first direction. As illustrated in FIG. 6, the solenoid actuator 150 includes a main part 151, and a movable part 152. The solenoid actuator 150 is configured to cause the movable chute 120 to move between the first position illustrated in FIG. 2 and the second position illustrated in FIG. 3.

Figure 10:
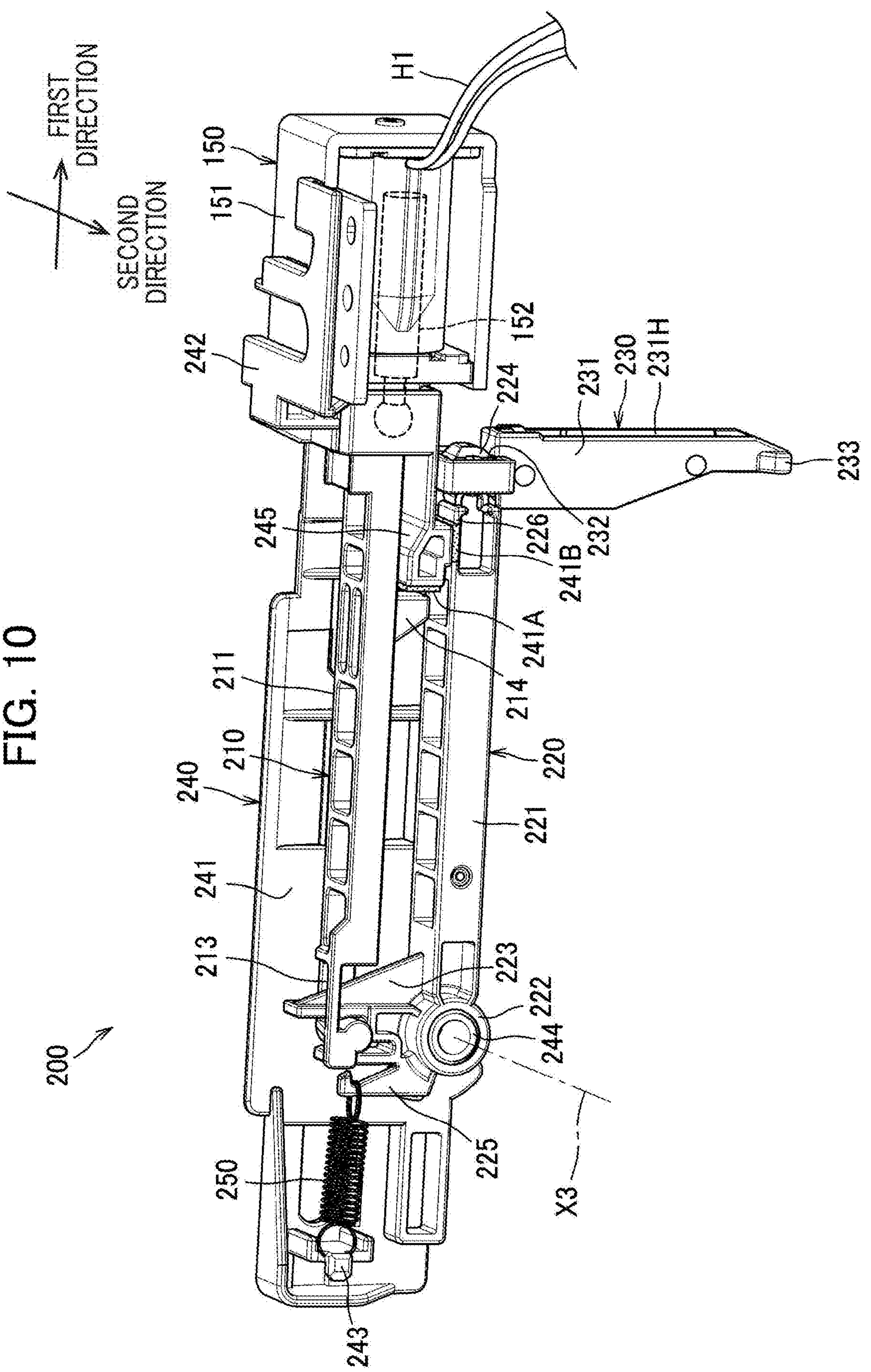
FIG. 10 is a perspective view of a link mechanism and a solenoid actuator.

As illustrated in FIG. 10, the main part 151 has a rectangular parallelepiped shape. The movable part 152 is a pin that is linearly movable in the first direction relative to the main part 151. The movable part 152 is movable between a third position and a fourth position. In a case where an ON signal is not transmitted from the controller CU, the movable part 152 is positioned at the third position. In a case where an ON signal is transmitted from the controller CU, the movable part 152 is pulled to move to the fourth position. The movable part 152 at the fourth position is positioned further toward the other side in the first direction relative to the movable part 152 at the third position. In a case where an ON signal is not transmitted from the controller CU, the movable part 152 moves back to the third position because the movable part 152 is no longer pulled toward the fourth position.

In a state where the movable part 152 is at the third position, the movable chute 120 is positioned at the first position. In a state where the movable part 152 is at the fourth position, the movable chute 120 is positioned at the second position.

As illustrated in FIG. 2, the entirety of the movable part 152 is overlapped with the exhaust fan FA when viewed in the first direction. In other words, the entirety of a projection obtained by light projection to the movable part 152 in the first direction is overlapped with an area in which the exhaust fan FA is positioned.

Figure 11:
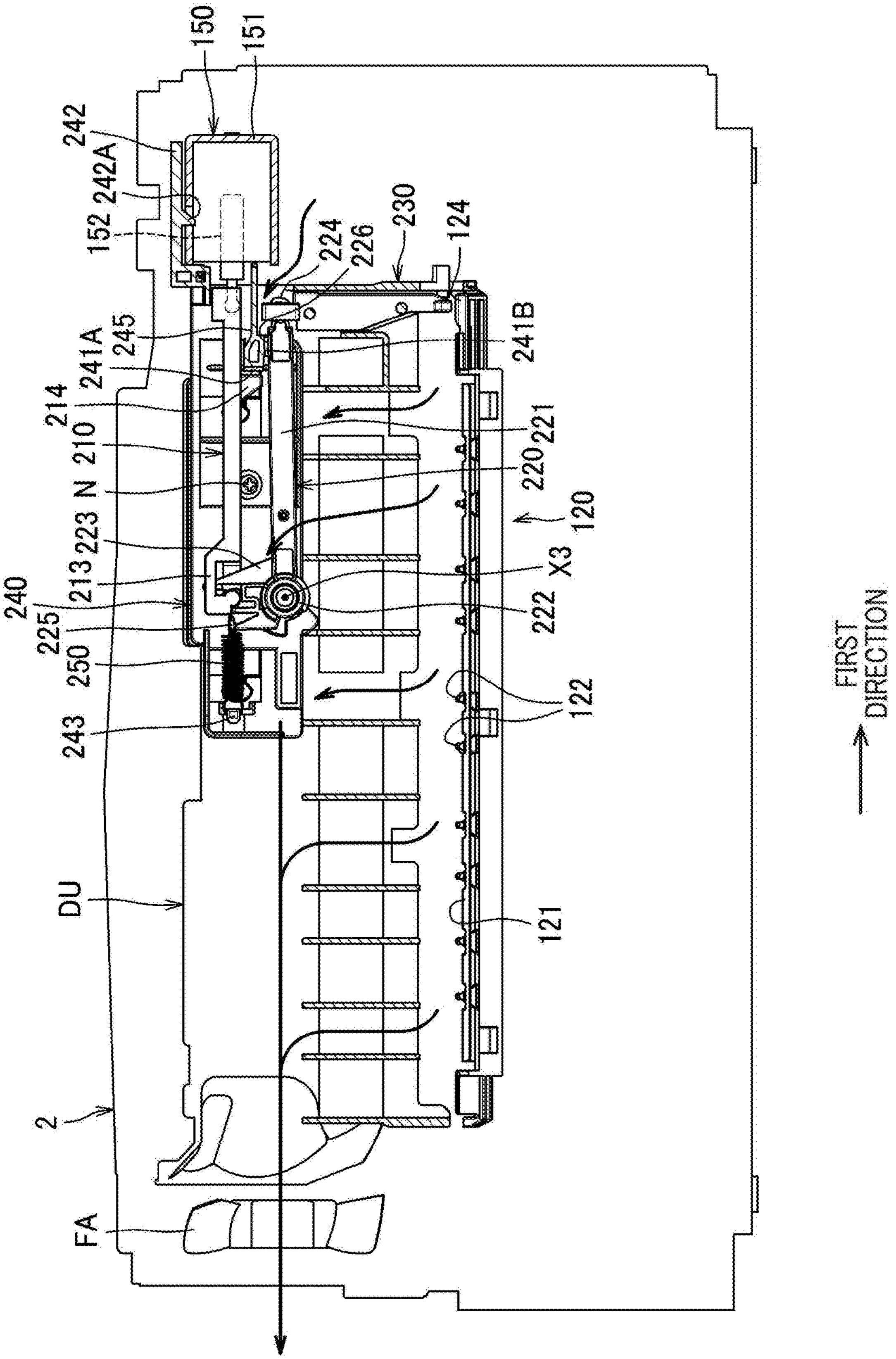
FIG. 11 is a view illustrating the link mechanism when the movable chute is at the first position.
Figure 12:
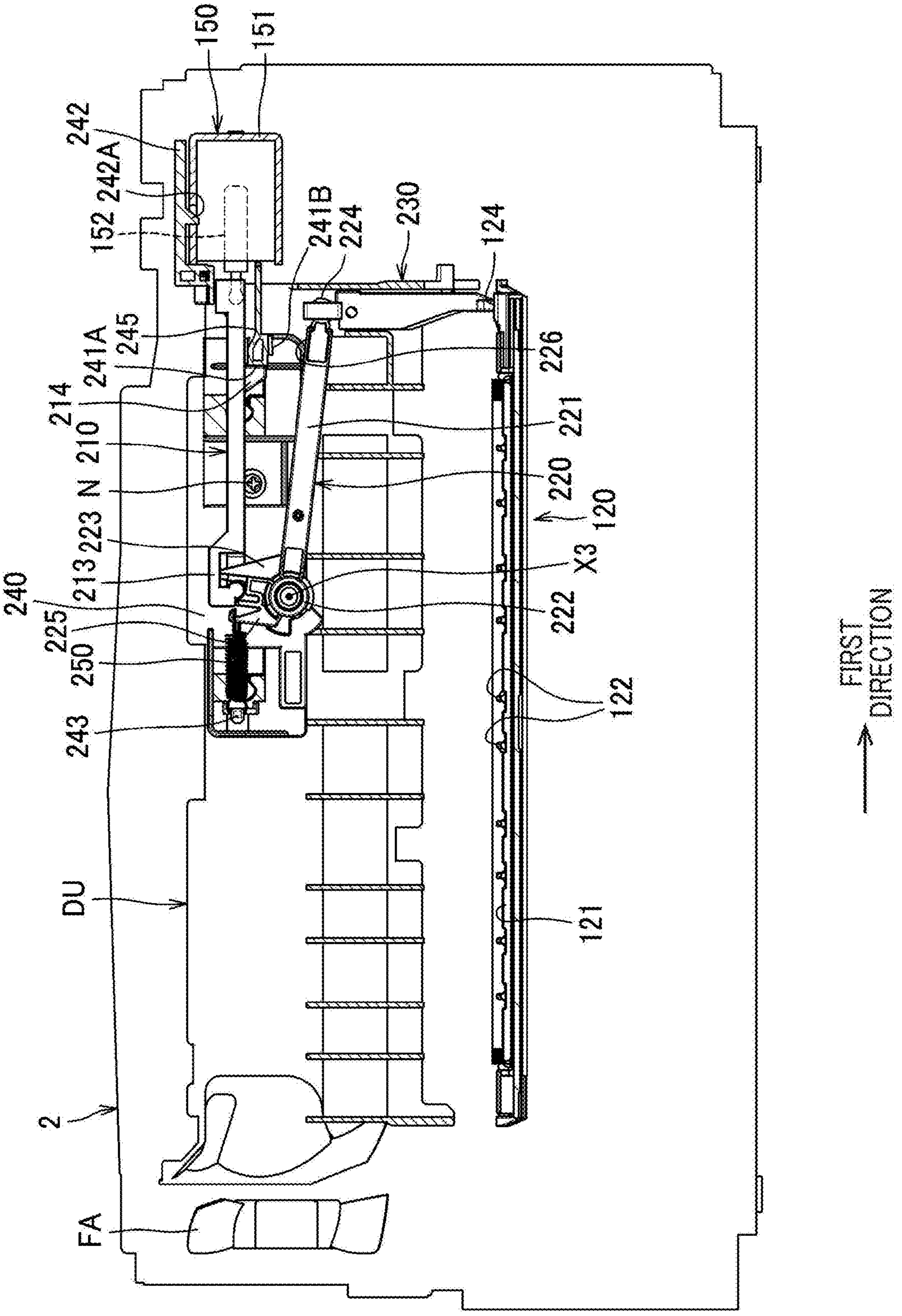
FIG. 12 is a view illustrating the link mechanism when the movable chute is at the second position.

Further, as illustrated in FIGS. 11 and 12, a distal end portion of the movable part 152 is positioned inside the duct DU both in a state where the movable part 152 is at the third position and in a state where the movable part 152 is at the fourth position. That is, a part of the movable part 152 is overlapped with the flow passage of the duct DU when viewed in the second direction.

The link mechanism 200 illustrated in FIG. 10 is a mechanism configured to cause the movable chute 120 to be positioned at the first position when the movable part 152 is at the third position, and to cause the movable chute 120 to be positioned at the second position when the movable part 152 is at the fourth position. A part of the link mechanism 200 is positioned inside the duct DU (see FIG. 5). The link mechanism 200 includes a first link 210, a second link 220, a third link 230, a holder 240, and a coil spring 250.

The holder 240 holds a part of the link mechanism 200. The holder 240 is supported by the duct DU while the holder 240 holds the part of the link mechanism 200. Specifically, the holder 240 is fixed to the duct DU by engaging with the first protrusion DU11 and the second protrusion DU12 of the duct DU (see FIG. 7). The holder 240 includes a base part 241, an extension part 242, a first hook 243, a boss 244, and an abutment part 245.

The base part 241 extends in the first direction. The extension part 242 extends upward from an end of the base part 241 on the one side in the first direction, and then extends toward the one side in the first direction. The extension part 242 covers a part of an upper portion of the main part 151 of the solenoid actuator 150. As illustrated in FIG. 11, the extension part 242 includes an engagement pawl 242A that protrudes downward therefrom. The engagement pawl 242A is in engagement with an upper surface of the main part 151 of the solenoid actuator 150. This engagement between the engagement pawl 242A and the main part 151 fixes the holder 240 in position relative to the solenoid actuator 150 in the first direction.

Referring back to FIG. 10, the first hook 243 is positioned on an end portion of the base part 241 on the other side in the first direction. One end of the coil spring 250 is in engagement with the first hook 243.

The boss 244 is positioned on the end portion of the base part 241 on the other side in the first direction. The boss 244 is a protrusion that has a hollow cylindrical shape and that protrudes from the base part 241 toward the one side in the second direction. The boss 244 supports the second link 220 so that the second link 220 is pivotally movable.

The abutment part 245 is positioned between the extension part 242 and the boss 244 in the first direction. The abutment part 245 protrudes from the base part 241 toward the one side in the second direction. The abutment part 245 has a first abutment surface 241A, and a second abutment surface 241B. A sponge is adhered to each of the first abutment surface 241A and the second abutment surface 241B. The thickness of the sponges is reduced to a prescribed thickness when the sponges are pressed by the corresponding first link 210 or second link 220.

The first abutment surface 241A faces the other side in the first direction. The first abutment surface 241A serves as an abutment surface that abuts on the first link 210 when the movable part 152 moves from the third position to the fourth position.

The second abutment surface 241B faces downward. The second abutment surface 241B serves as an abutment surface that abuts on the second link 220 when the movable part 152 moves from the fourth position to the third position.

The first link 210 is connected to the solenoid actuator 150. The first link 210 is linearly movable in the first direction together with the movable part 152 of the solenoid actuator 150 in accordance with movement of the movable part 152 in the first direction. The first link 210 extends in the first direction. The first link 210 includes a base part 211 and a first protruding part 214, and has a first hole 213.

The base part 211 extends in the first direction and has a rod-like shape with a rectangular cross section. The distal end portion of the movable part 152 of the solenoid actuator 150 is connected to an end portion of the base part 211 on the one side in the first direction. Hence, the first link 210 moves in the first direction in accordance with the movement in the first direction of the movable part 152 of the solenoid actuator 150.

The first hole 213 is formed at an end portion of the base part 211 on the other side in the first direction. The first hole 213 has a rectangular shape and penetrates the base part 211 in the up-down direction.

The first protruding part 214 extends downward from the end portion of the base part 211 on the one side in the first direction. The first protruding part 214 is a part that abuts on the first abutment surface 241A of the holder 240 when the movable part 152 moves from the third position to the fourth position.

The second link 220 is connected to the first link 210. The second link 220 is a member that is pivotally movable about a first axis X3 in response to the movement in the first direction of the first link 210. The second link 220 is positioned downward of the first link 210. The second link 220 includes a base part 221, a hollow cylindrical part 222, a second protruding part 223, a third protruding part 224, and a second hook 225, and has a third abutment surface 226.

The base part 221 extends in the first direction and has a rod-like shape with a rectangular cross section. The hollow cylindrical part 222 is positioned on an end of the base part 221 on the other side in the first direction. The boss 244 of the holder 240 is inserted through the hollow cylindrical part 222, thereby enabling the second link 220 to be pivotally movable about the first axis X3.

The second protruding part 223 protrudes upward from an outer peripheral surface of the hollow cylindrical part 222. The second protruding part 223 is inserted through the first hole 213 of the first link 210. Accordingly, the second link 220 is connected to another end portion of the first link 210, and the pivotal movement of the second link 220 about the first axis X3 in response to the movement of the first link 210 is enabled. Specifically, as the first link 210 moves toward the one side in the first direction, the first link 210 presses the second protruding part 223 toward the one side in the first direction, whereby the second link 220 pivotally moves in a clockwise direction in FIG. 10.

The third protruding part 224 protrudes toward the one side in the first direction from an end of the base part 221 on the one side in the first direction. The third protruding part 224 is connected to the third link 230.

The second hook 225 protrudes upward from the outer peripheral surface of the hollow cylindrical part 222. The second hook 225 is positioned further toward the other side in the first direction relative to the second protruding part 223. Another end of the coil spring 250 is in engagement with the second hook 225.

The third abutment surface 226 is positioned on an upper surface of the end of the base part 221 on the one side in the first direction. The third abutment surface 226 abuts on the second abutment surface 241B of the holder 240 when the second link 220 pivotally moves in a counterclockwise direction in FIG. 10 to move upward. This abutment of the third abutment surface 226 with the second abutment surface 241B restrains further pivotal movement of the second link 220.

The third link 230 is connected to the second link 220. When the second link 220 pivotally moves, the third link 230 is linearly movable in the up-down direction in accordance with the movement in the up-down direction of the third protruding part 224 of the second link 220. Specifically, the third link 230 is movable between a pressing position and an allowing position in response to the pivotal movement of the second link 220. When at the pressing position, the third link 230 presses the movable chute 120 downward to position the movable chute 120 at the second position. When at the allowing position, the third link 230 does not press the movable chute 120 downward, thereby allowing the movable chute 120 to be positioned at the first position. The third link 230 extends in the up-down direction, and is positioned downward of the second link 220. The third link 230 includes a base part 231 and a chute pressing part 233, and has a third hole 232.

Figure 13:
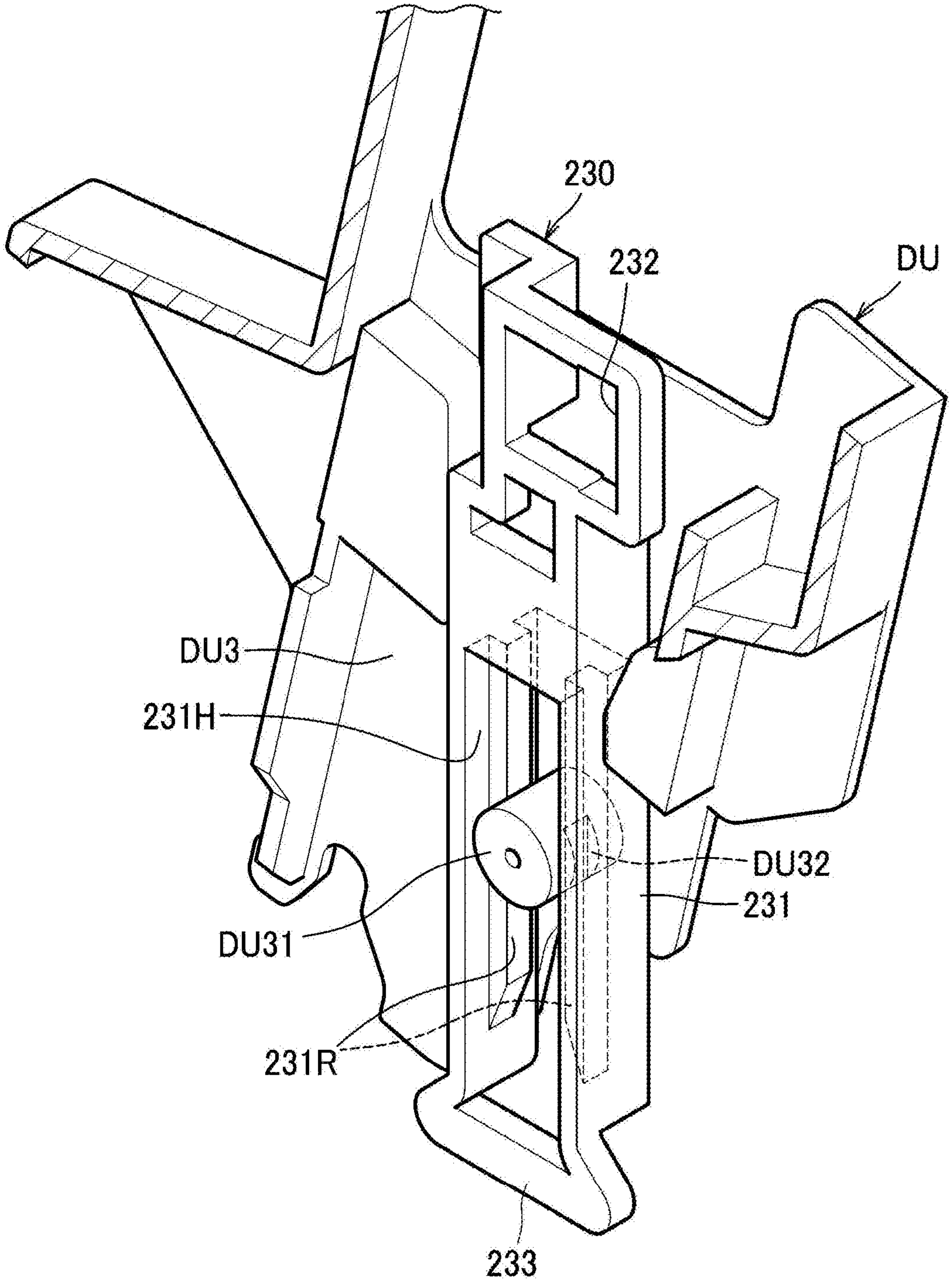
FIG. 13 is a perspective view of a third link.

The base part 231 extends in the up-down direction and has a rod-like shape with a rectangular cross section. As illustrated in FIG. 13, the base part 231 has a base hole 231H, and includes a pair of rails 231R. The base hole 231H is formed in the base part 231, and has a rectangular shape elongated in the up-down direction. The base hole 231H penetrates the base part 231 in the first direction. The rails 231R extend in the up-down direction, and are positioned on respective inner walls defining the base hole 231H. The rails 231R are in engagement with the respective grooves DU32 formed on the protruding part DU31 of the duct DU. This engagement between the rails 231R and the corresponding grooves DU32 enables the linear movement in the up-down direction of the third link 230.

The third hole 232 is a hole formed at an upper end portion of the third link 230. The third hole 232 has a rectangular shape and allows the third protruding part 224 of the second link 220 is inserted therethrough. With this configuration, the third link 230 linearly moves in the up-down direction in accordance with the pivotal movement of the second link 220.

The chute pressing part 233 is a part configured to press the movable chute 120 downward. The chute pressing part 233 constitutes a lower end portion of the third link 230. The chute pressing part 233 contacts the pressed part 124 of the movable chute 120 to press the movable chute 120 downward when the third link 230 moves downward. In this way, the third link 230 presses against the conveying surface of the movable chute 120 when moving the movable chute 120 from the first position to the second position.

The coil spring 250 is a tension spring. The coil spring 250 constantly pulls the second link 220 toward the other side in the first direction.

As illustrated in FIG. 11, in a case where no ON signal is transmitted from the controller CU, the movable part 152 is positioned at the third position. In a case where an ON signal is transmitted from the controller CU, the movable part 152 is pulled to move from the third position to the fourth position. In accordance with the movement of the movable part 152 from the third position to the fourth position illustrated in FIG. 12, the first link 210 linearly moves together with the movable part 152 toward the one side in the first direction.

As the first link 210 linearly moves toward the one side in the first direction, the second protruding part 223 of the second link 220 moves toward the one side in the first direction by the first link 210, whereby the second link 220 pivotally moves in the clockwise direction in FIG. 12. As a result of the pivotal movement of the second link 220 in the clockwise direction, the third protruding part 224 presses the third link 230 downward. Accordingly, the third link 230 moves downward to the pressing position, thereby causing the chute pressing part 233 to press the pressed part 124 of the movable chute 120 downward. Consequently, the movable chute 120 moves from the first position to the second position.

On the other hand, in a case where an ON signal is no longer received from the controller CU, the first link 210 does not press the second link 220, because the movable part 152 is no longer pulled toward the fourth position. Hence, the second link 220 pivotally moves in the counterclockwise direction from the state illustrated in FIG. 12 due to an urging force of the coil spring 250.

In accordance with the pivotal movement of the second link 220 in the counterclockwise direction, the third link 230 is pulled upward, as illustrated in FIG. 11, by the engagement of the third protruding part 224 of the second link 220 with the third hole 232 of the third link 230. Hence, the third link 230 moves from the pressing position to the allowing position so that the chute pressing part 233 of the third link 230 does not press the pressed part 124 of the movable chute 120.

Upon movement of the third link 230 to the allowing position, the movable chute 120 moves from the second position to the first position by the urging force of the springs 130. Further, in accordance with the pivotal movement of the second link 220 in the counterclockwise direction, the first link 210 is pulled toward the other side in the first direction by the second protruding part 223 of the second link 220. Since the first link 210 is pulled toward the other side in the first direction, the movable part 152 moves together with the first link 210 toward the other side in the first direction, thereby returning to the third position.

The image forming apparatus 1 described above can exhibit the following technical advantages.

The image forming apparatus 1 includes the solenoid actuator 150 configured to cause the movable chute 120 to move in the up-down direction. According to the present embodiment, each time an image is formed on a sheet S, the controller CU causes the movable chute 120 to move to the first position illustrated in FIG. 2 and to the second position illustrated in FIG. 3. At this time, the controller CU causes the movable chute 120 to be positioned at the first position before the front edge of the sheet S reaches the fixing device 6, and causes the movable chute 120 to move from the first position to the second position after the front edge of the sheet S reaches the fixing device 6.

Since the movable chute 120 is at the first position before the front edge of the sheet S reaches the fixing device 6, the sheet S can enter the fixing nipping region NP2 with an optimal angle relative to the fixing nipping region NP2. Hence, wrinkles are unlikely to be generated on the sheet S at the time of entry of the sheet S into the fixing nipping region NP2.

Further, the movable chute 120 is at the second position while the sheet S is nipped both at the transfer nipping region NP1 and at the fixing nipping region NP2. Hence, even when the sheet S is bent between the transfer nipping region NP1 and the fixing nipping region NP2 due to the reason that a conveying speed of the sheet S at the transfer nipping region NP1 is faster than the conveying speed of the sheet S at the fixing nipping region NP2, the sheet S can be conveyed while flexure of the sheet S is absorbed.

Specifically, by moving the movable chute 120 from the first position to the second position, a space between the transfer nipping region NP1 and the fixing nipping region NP2 can be expanded downward, and the movable chute 120 can support the sheet S from below to guide the same with the space being expanded. This configuration can restrain the sheet S from changing its posture while being conveyed and from abutting against ambient components in the main housing 2 even when the sheet S is bent downward, thereby suppressing a toner image prior to fixing from scaling and a jamming of the sheet S from occurring.

Here, the solenoid actuator 150 may generate heat in a case where the movable chute 120 is operated frequently. The solenoid actuator 150 generating heat may be inferior to that does not generate heat in terms of performance, such as lowering of a suction force per unit electricity. Therefore, there is a need for efficient cooling of the solenoid actuator 150. In this connection, according to the present embodiment, the solenoid actuator 150 is overlapped with the exhaust fan FA when viewed in the first direction, and hence, the solenoid actuator 150 can be positioned in the middle of an air vent passage toward the exhaust fan FA. Thus, air ambient to the solenoid actuator 150 can efficiently flow as indicated by arrows in FIG. 11, whereby efficient cooling of the solenoid actuator 150 can be attained in comparison with a configuration in which the solenoid actuator 150 is not overlapped with the exhaust fan FA when viewed in the first direction. This configuration can achieve frequent operation of the movable chute 120.

Further, the solenoid actuator 150 is supported by the first frame F1, which is positioned further toward the one side in the first direction relative to the movable chute 120. Therefore, a movable range in the up-down direction of the movable chute 120 is not limited by the solenoid actuator 150, whereby the movable chute 120 can move greatly in the up-down direction.

Further, the solenoid actuator 150 is overlapped with the flow passage in the duct DU when viewed in the first direction. Hence, air heated by the solenoid actuator 150 can be introduced to the exhaust fan FA using the duct DU with a shortest distance, thereby attaining further efficient cooling of the solenoid actuator 150.

Further, the entirety of the movable part 152 of the solenoid actuator 150 is overlapped with the exhaust fan FA when viewed in the first direction. Accordingly, the movable part 152 can be efficiently cooled.

Further, since the duct DU extends from the first frame F1 to the second frame F2, the duct DU can guide air heated by the solenoid actuator 150 to the exhaust fan FA, whereby efficient cooling of the solenoid actuator 150 can be realized.

Further, a part of the link mechanism 200 is positioned inside the duct DU. Therefore, there is no need to provide an additional space for installing the link mechanism 200 in the main housing 2, thereby restraining an increase in size of the image forming apparatus 1.

Further, the link mechanism 200 includes the first link 210, the second link 220, and the third link 230. Hence, an amount of movement of the movable chute 120 can be made greater than an amount of movement of the movable part 152 of the solenoid actuator 150 using the link mechanism 200. Accordingly, enlargement in size of the solenoid actuator 150 can be restrained, thereby reducing consumed electric power and heat generation.

Further, the first link 210 contacts the first abutment surface 241A of the holder 240 at the time of the movement of the movable part 152 from the third position to the fourth position. Therefore, the first link 210 is fixed in position by the first abutment surface 241A in a state where the movable part 152 is positioned at the fourth position. This configuration can maintain a position of the first link 210 with high accuracy while the movable part 152 is at the fourth position.

Further, since a sponge is adhered to each of the first abutment surface 241A and the second abutment surface 241B, generation of abnormal noise can be restrained at the time of abutment of the first abutment surface 241A and the second abutment surface 241B with the first link 210 and the second link 220, respectively. Also, the thickness of the sponges is reduced to the predetermined thickness when pressure is applied from the respective first link 210 and second link 220. Hence, fluctuation in position of the movable chute 120 positioned at the second position can be restrained.

Further, the solenoid actuator 150 is supported by and positioned adjacent to the first frame F1 on which the control board B1 is mounted. Therefore, the first harness H1 connecting the control board B1 and the solenoid actuator 150 to each other can have a shortened route. Further, since the first harness H1 has the shortened length, a risk of the first harness H1 receiving a noise from ambient components and a risk of the first harness H1 applying a noise to the ambient components can be reduced. Further, the wiring cost can also be reduced.

Further, since the component side B11 of the control board B1 faces in a direction away from the movable chute 120, noise generated from the solenoid actuator 150 can be restrained from reaching the component side B11.

Further, the first frame F1 is positioned between the solenoid actuator 150 and the radio board B3. This configuration can restrain noise generated from the solenoid actuator 150 from reaching the radio board B3.

Further, since the upper end of the radio board B3 is positioned further upward relative to the upper end of the solenoid actuator 150, noise generated from the solenoid actuator 150 is unlikely to affect the radio board B3, thereby enhancing communication stability of the radio board B3. The communication partner of the radio board B3 is a portable communication terminal owned by a user, for example. Generally, the user holds the portable communication terminal at a position higher than the image forming apparatus 1. Therefore, since the solenoid actuator 150 is not provided at a position further upward relative to the radio board B3, i.e., at a position between the radio board B3 and the portable communication terminal, the communication between the radio board B3 and the portable communication terminal is unlikely to be affected by noise from the solenoid actuator 150.

Further, since the cable CB electrically connecting the control board B1 and the second board B2 to each other extends through a space below the movable chute 120, the cable CB is unlikely to interfere with the movable chute 120.

Further, the cable CB is positioned below the movable chute 120 at a position between, in the conveying direction, the pivot axis X2 of the movable chute 120 and the lowermost point BP of the movable chute 120 positioned at the second position. Therefore, the cable CB can be wired at a position below a portion of the movable chute 120 whose amount of movement in the up-down direction is smaller, thereby suppressing interference of the cable CB with the movable chute 120.

Further, the link mechanism 200 for moving the movable chute 120 includes the first link 210, the second link 220, and the third link 230. The configuration of the link mechanism 200 enables the amount of movement of the movable chute 120 to be greater than the amount of movement of the movable part 152 of the solenoid actuator 150. Accordingly, enlargement in size of the solenoid actuator 150 can be restrained, thereby reducing power consumption and heat generation.

Further, the controller CU causes the movable chute 120 to move from the first position to the second position each time an image is formed on a sheet S, thereby suppressing generation of wrinkle on a sheet S.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the image forming apparatus 1 according to the above-described embodiment, the transfer roller 53 that faces the photosensitive drum 51 is configured to transfer a toner image formed on the photosensitive drum 51 onto the sheet S. However, an intermediate transfer belt may be provided such that a toner image on the photosensitive drum 51 is transferred onto the intermediate transfer belt, and the toner image on the intermediate transfer belt is then transferred onto the sheet S by a transfer roller or a secondary transfer roller.

Further, in the above-described embodiment, the movable chute 120 is pivotally movable between the first position and the second direction about the pivot axis X2 extending in the first direction. As a modification, the movable chute 120 may be linearly movable between the first position and the second direction.

Further, although the image forming apparatus 1 is a monochromatic laser printer in the above-described embodiment, the image forming apparatus 1 may be an image forming apparatus for a multiple color, a copying machine, or a multifunction peripheral. Further, the image forming apparatus 1 may employ an exposure unit 40 including a plurality of LEDs, and the plurality of LEDs may be flickered on the basis of image data to expose the surface of the photosensitive drum 51 to light. Further, the sheet S may be an OHP sheet instead of a sheet of paper. Further, the heating rotor 61 may employ a roller instead of an endless belt, and the pressure rotor 62 may employ and an endless belt instead of a roller.

The components described in the embodiment and modifications described above may be combined as appropriate to be implemented.

What is claimed is:

1. An image forming apparatus comprising:

a main housing;

a transfer roller rotatable about a rotation axis extending in a first direction, the transfer roller being configured to transfer a toner image on a sheet;

a fixing device configured to fix the toner image that has been transferred on the sheet to the sheet;

a movable chute positioned between the transfer roller and the fixing device in a conveying direction in which the sheet is conveyed, the movable chute being configured to guide the sheet, the movable chute being movable between:

a first position; and a second position at which a downstream end in the conveying direction of the movable chute is positioned further downward relative to the downstream end in the conveying direction of the movable chute positioned at the first position; and a solenoid actuator configured to cause the movable chute to move between the first position and the second position, wherein the main housing includes:

a first frame positioned further toward one side in the first direction relative to the movable chute, the first frame supporting the solenoid actuator; and a second frame positioned further toward another side in the first direction relative to the movable chute, the image forming apparatus further comprising:

a control board positioned at the first frame, the control board including a controller configured to control at least the solenoid actuator.

2. The image forming apparatus according to claim 1, further comprising:

a harness connecting the control board and the solenoid actuator to each other, wherein the control board has a component side on which a connector connected to the harness is mounted, and wherein the component side faces in a direction away from the movable chute in the first direction, and is positioned farther from the movable chute than the solenoid actuator is from the movable chute in the first direction.

3. The image forming apparatus according to claim 2, further comprising:

a radio board for performing wireless communication, the radio board being directly connected to the control board, wherein the radio board is positioned on an opposite side of the first frame from the solenoid actuator in the first direction, and wherein the solenoid actuator is overlapped with the radio board via the first frame when viewed in the first direction.

4. The image forming apparatus according to claim 3, wherein the control board is positioned between the movable chute and the radio board in the first direction.

5. The image forming apparatus according to claim 3, wherein an upper end of the radio board is positioned further upward relative to an upper end of the solenoid actuator.

6. The image forming apparatus according to claim 1, further comprising:

a second board positioned at the second frame; and a cable electrically connecting the control board and the second board to each other, wherein the movable chute is pivotally movable about a pivot axis extending in the first direction between the first position and the second position, and wherein the cable extends at a position downward of the movable chute and at a position between, in the conveying direction, the pivot axis and a lowermost point of the movable chute positioned at the second position.

7. The image forming apparatus according to claim 1, wherein, each time an image is formed on a sheet, the controller controls the solenoid actuator to perform:

causing, before a downstream edge in the conveying direction of the sheet reaches the fixing device, the movable chute to be positioned at the first position; and causing, after the downstream edge in the conveying direction of the sheet reaches the fixing device, the movable chute to move from the first position to the second position.

8. An image forming apparatus comprising:

a main housing;

a transfer roller rotatable about a rotation axis extending in a first direction, the transfer roller being configured to transfer a toner image on a sheet;

a fixing device configured to fix the toner image that has been transferred on the sheet to the sheet;

a movable chute positioned between the transfer roller and the fixing device in a conveying direction in which the sheet is conveyed, the movable chute being configured to guide the sheet, the movable chute being movable between:

a first position; and a second position at which a downstream end in the conveying direction of the movable chute is positioned further downward relative to the downstream end in the conveying direction of the movable chute positioned at the first position, and a solenoid actuator configured to cause the movable chute to move between the first position and the second position, wherein the main housing includes:

a first frame positioned further toward one side in the first direction relative to the movable chute the first frame supporting the solenoid actuator; and a second frame positioned further toward another side in the first direction relative to the movable chute, wherein the solenoid actuator includes a main part and a movable part, and wherein the movable part is movable between:

a third position; and a fourth position at which the movable part is positioned further toward the one side in the first direction relative to the movable part positioned at the third position.

9. The image forming apparatus according to claim 8, further comprising:

a link mechanism configured to cause the movable chute to be positioned at the first position when the movable part is at the third position and to cause the movable chute to be positioned at the second position when the movable part is at the fourth position, wherein the link mechanism includes:

a first link having one end connected to the movable part, the first link being movable in the first direction;

a second link connected to another end of the first link, the second link being pivotally movable about an axis in accordance with movement of the first link; and a third link connected to the second link, wherein, in accordance with pivotal movement of the second link, the third link is movable between:

a pressing position at which the third link presses the movable chute downward to position the movable chute at the second position; and an allowing position at which the third link allows the movable chute to be positioned at the first position.

10. An image forming apparatus comprising:

a main housing;

a transfer roller rotatable about a rotation axis extending in a first direction, the transfer roller being configured to transfer a toner image on a sheet;

a fixing device configured to fix the toner image that has been transferred on the sheet to the sheet;

a movable chute positioned between the transfer roller and the fixing device in a conveying direction in which the sheet is conveyed, the movable chute being configured to guide the sheet, the movable chute being movable between:

a first position; and a second position at which a downstream end in the conveying direction of the movable chute is positioned further downward relative to the downstream end in the conveying direction of the movable chute positioned at the first position; and a solenoid actuator configured to cause the movable chute to move between the first position and the second position, wherein the main housing includes:

a first frame positioned further toward one side in the first direction relative to the movable chute, the first frame supporting the solenoid actuator; and a second frame positioned further toward another side in the first direction relative to the movable chute, the image forming apparatus further comprising:

an exhaust fan configured to discharge air in the main housing out of the main housing, wherein the solenoid actuator is overlapped with the exhaust fan when viewed in the first direction.

11. The image forming apparatus according to claim 10, further comprising:

a duct extending in the first direction between the exhaust fan and the solenoid actuator, the duct defining a flow passage along which air flows in the first direction, wherein the solenoid actuator is overlapped with the flow passage when viewed in the first direction.

12. The image forming apparatus according to claim 11, wherein the solenoid actuator includes a main part and a movable part, and wherein an entirety of the movable part is overlapped with the exhaust fan when viewed in the first direction.

13. The image forming apparatus according to claim 12, wherein a part of the movable part is overlapped with the flow passage when viewed in a second direction orthogonal to both the first direction and an up-down direction.

14. The image forming apparatus according to claim 12, wherein the movable part is movable between:

a third position; and a fourth position at which the movable part is positioned further toward the one side in the first direction relative to the movable part positioned at the third position, the image forming apparatus further comprising:

a link mechanism configured to cause the movable chute to be positioned at the first position when the movable part is at the third position and to cause the movable chute to be positioned at the second position when the movable part is at the fourth position, wherein a part of the link mechanism is positioned inside the duct.

15. The image forming apparatus according to claim 14, wherein the link mechanism includes:

a first link having one end connected to the movable part, the first link being movable in the first direction;

a second link connected to another end of the first link, the second link being pivotally movable about an axis in accordance with movement of the first link; and a third link connected to the second link, wherein, in accordance with pivotal movement of the second link, the third link is movable between:

a pressing position at which the third link presses the movable chute downward to position the movable chute at the second position; and an allowing position at which the third link allows the movable chute to be positioned at the first position.

16. The image forming apparatus according to claim 14, wherein the movable chute has a conveying surface for conveying the sheet, and wherein the link mechanism presses against the conveying surface when moving the movable chute from the first position to the second position.

17. The image forming apparatus according to claim 11, wherein the exhaust fan is supported by the second frame, and wherein the duct extends from the first frame to the second frame.

18. The image forming apparatus according to claim 11, wherein the duct is overlapped with the movable chute when viewed in an up-down direction.

19. The image forming apparatus according to claim 10, wherein the movable chute is pivotally movable about a pivot axis extending in the first direction between the first position and the second position.

* * * * *